Nov. 26, 1929.  R. W. A. BREWER  1,736,875
SPEED REDUCTION MECHANISM
Filed April 20, 1927
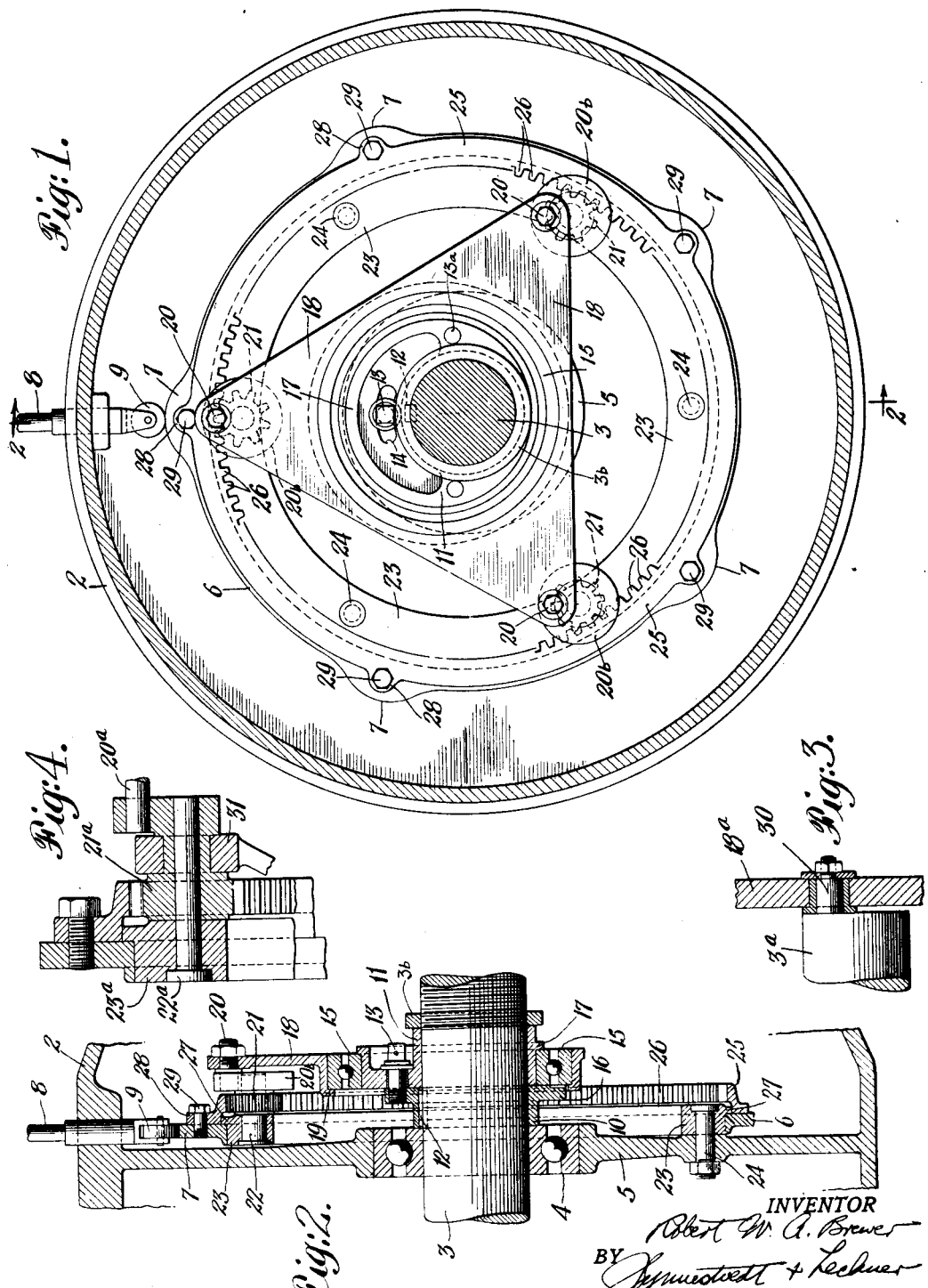
INVENTOR
Robert W. A. Brewer
BY
ATTORNEYS Patented Nov. 26, 1929

1,736,875

UNITED STATES PATENT OFFICE

ROBERT W. A. BREWER, OF JENKINTOWN, PENNSYLVANIA, ASSIGNOR TO HAROLD F. PITCAIRN, OF BRYN ATHYN, PENNSYLVANIA

SPEED-REDUCTION MECHANISM

Application filed April 20, 1927. Serial No. 185,123.

This invention relates to speed reduction mechanisms and is applicable to numerous devices and apparatus where it is desired to operate a driven member at a lower speed than the member driving it. For purposes of illustration, however, I disclose the invention herein as particularly applied to a cam mechanism such as used in a radial internal combustion engine.

Among the primary objects of the invention are: to obtain speed reduction, even to high ratios, with the least complication of mechanism; to obtain such reduction with apparatus of little weight and occupying a minimum amount of space, these considerations being of especial importance in connection with airplane engines, in which the invention may be advantageously employed; to provide such a mechanism in which there are no dead points in the direction of pressure applied to the driven member; and to provide multiple tooth engagement between the driven member and the driving means whereby distribution of pressure, quietness of operation, reduction of lost motion or backlash, and longer life of parts, are obtained.

A further object of the invention is to eliminate cumbersome trains of gears with their attendant lost motion and other disadvantages in speed reduction mechanism.

Still another object of the invention is to provide a speed reduction mechanism wherein the driven member is subjected to substantially no thrusts or forces except the torque imparted to it.

More specifically, I aim by my invention to provide a speed reduction mechanism wherein the driven member is positioned concentrically with the driving member and is driven by means of a crank or eccentric operating a strap which actuates preferably a plurality of spaced gears each acting on said driven member and between which the load is distributed.

Still another object of the invention is to provide such a mechanism which shall be simple in construction and readily assembled and disassembled, and the parts of which, as they are assembled, will secure prior parts in place, serially.

How these objects and their attendant advantages, and others which are incident to the invention or which will occur to those skilled in the art, are obtained will be clear from the following description taken together with the accompanying drawings, in which:

Fig. 1 is an end elevational view, with parts in section, of an engine construction embodying my invention;

Fig. 2 is a section taken on the line 2—2 of Fig. 1;

Fig. 3 illustrates a modified form of a portion of the mechanism; and

Fig. 4 shows a modification of another portion thereof.

Referring now to Figs. 1 and 2, it will be seen that I have therein illustrated a portion of a radial airplane engine having a casing 2 and a crankshaft 3 supported at a bearing 4 in the web or other rigid structure 5. Concentric with the shaft is a cam ring 6 having cams 7 by which the valve rods 8 are operated through their rollers 9 (only one of which rods is shown, it being understood that there are a number of them spaced around the casing 2, one for each valve of the engine).

To drive the cam ring 6, at a properly reduced speed, from the shaft 3, I have interposed a mechanism embodying the features and advantages of the present invention, which will now be described.

On the shaft 3 is mounted an eccentric sheave comprising a fixed portion 10, secured to the shaft, as by a key 12, and an adjustable portion 11 mounted on the shaft and secured to the fixed portion by a pin or bolt 13 threaded into the fixed portion and extending through a curved slot 14 in said adjustable portion. The sheave carries a bearing 15, which, when the fixed and adjustable portions 10 and 11 are tightly secured by the pin 13, is held between the flanges 16 and 17 on the fixed and adjustable sheave portions, respectively.

On the outer ring of bearing 15 is carried the eccentric plate or strap 18 which has an inner flange 19 to prevent its slipping off the bearing. At a plurality of equi-spaced points on the strap, equi-distant from the center thereof, are holes, receiving pins 20 of cranks 20$^b$, in this instance three being shown, each of which is connected to, and adapted to actuate, a toothed gear wheel or pinion 21 on a pin or shaft 22 mounted in any suitable fixed structure, which in this instance is shown as an annular member or mounting ring 23 secured, as by bolts 24, to the web structure 5. The throw of the crank 20$^b$ is, of course, the same as the offset of the eccentric from the center line of shaft 3.

Positioned to be driven by the wheels 21 is an internal ring gear or member 25 having teeth 26 engaging the teeth of said gear wheels 21. The cam ring 6, which is positioned on the periphery of the fixed ring 23 behind the flange 27 thereof, is secured to the ring gear, as by means of ears 28 on the latter and bolts 29.

When assembling, the parts are put in in their order, it being apparent that each will fit only one way and in one place, and the parts as they are serially put in place secure prior parts in position, the mounting ring 23 retaining the cam ring 6 and the gear 25 secured thereto, and the gears 21 with their cranks 20$^b$ being retained against the outside of the mounting ring, on their pins 22 by the strap 18, which in turn is retained by the bearing 15 secured by the eccentric sheave 10, 11, which is fixed against rotation by the key 12 and positively retained endwise of the shaft by the retaining nut 3$^b$. The adjusting slot 14 in the adjustable portion 11 of the sheave is of sufficient length that the eccentric strap may be shifted far enough to permit the correct relative positions of the meshing gear teeth and the cam lobes to be made, and thus to permit of the proper initial adjustment of the relative position of the lobes to the main crankpin of the engine so as to time the operation of the various parts in their correct phase position. After such adjustment is made, and the adjustment pin 13 is tightened, fixed pins 13$^a$ may also be employed, if desired, to insure the permanency of the adjustment of the portions 10 and 11 of the sheave.

It will now be seen that in operation, since the center of shaft 3 and the centers of gear wheels 21 are at fixed points, the rotation of the shaft carrying the eccentric sheave with it will cause a rotative shifting movement of the eccentric strap relative to each of said centers, thus rotating the gears 21 through one revolution for each revolution of the driving shaft, and the ratio between the number of teeth on the gears 21 and the number of teeth on the driven gear member 25 will determine the speed reduction. The ratio in the instant case is approximately 10 to 1, but it is obvious that by a mere alteration in the diameter of the pinions 21 employed (mounting them nearer to or farther from the center, in proportion to such alteration) practically any desired speed reduction may be obtained, it being remembered that the crank throw of the gears must always be maintained the same as the offset of the eccentric employed. In this connection I wish to point out that I may provide for the ready use of gears of different diameters in any suitable way, as, for instance, by providing in the fixed ring 23 a plurality of sets of holes for mounting the gear pins 22 at varying distances from the periphery, and by providing a corresponding plurality of sets of holes in the strap 18 at varying distances from its center to receive the crank pins 20.

It is very important that there should be no lost motion or backlash when a mechanism of this character is employed to operate or control relative speed mechanisms which must at all times maintain correct and exact phase relation. In the construction herein indicated, at least 6 teeth are always in engagement thus ensuring closeness of fit between the tooth faces and a reduction of specific tooth pressure, which in turn militates against rapid wear of the parts in intermittent contact. A consequent feature of multiple tooth contact is, of course, quietness of operation.

It should be noted that a mechanism of the character described has no dead point in the lines of pressure action and reaction because the circular path of each actuating pin 20, for example, is in all positions normal to the pressure face of a pair of teeth when in engagement.

In Fig. 3 I have illustrated a modification, in which, instead of an eccentric sheave, I provide on the end of shaft 3$^a$ an eccentrically located pin 30 to actuate the strap 18$^a$.

Fig. 4 illustrates a modification which may be employed when the invention is used in an apparatus requiring greater power transmission than required in connection with the device of Figs. 1 and 2. In this instance I have shown the pin or axis 22$^a$, of the gear 21$^a$ (corresponding to the gear 21 of the first two figures), provided with an additional support or bearing 31 in front of the gear, in addition to its bearing in the fixed ring 23$^a$ in back, so that the crank 20$^a$ will be immediately adjacent a bearing support.

It will be observed that the invention as illustrated employs three small gears 21 meshing with the common annular gear 25, (between which small gears the strap 18 may be considered as a linkage means), and while these provide a well-balanced support for the gear 25 and distribute the torque around its periphery, yet I do not limit myself to the use of three such gears, for a different number might well be used, and other changes in the details of construction be made, without departing from the spirit and scope of my invention.

I claim:—

1. A speed reduction mechanism comprising, in combination, an eccentric sheave actuated by a driving means, and adjustably related thereto, a strap operated by said eccentric, a plurality of pins actuated by said strap, said pins forming cranks having a throw equal to the throw of the eccentric, a plurality of gears rotated by said cranks, and a common gear member associated with and acted upon by said plurality of gears.

2. In an internal toothed gear speed reduction mechanism, a mounting ring forming a bearing retaining the internal toothed gear in position, journal pins associated with said mounting ring, driving pinions and attached cranks slidably located on said journal pins, a shaft concentric with the internal toothed gear wheel, and a common actuating crank mechanism mounted on said shaft having positive endwise location retaining the driving pinions in position on their journal pins.

3. In combination a driven member, actuating mechanism therefor including linkage means, a driving shaft concentric with said driven member, and driving means having one portion fixed to said shaft and another portion adjustably associated with the fixed portion and transmitting motion from the shaft to said linkage means.

4. A speed reduction mechanism comprising, in combination, an eccentric sheave actuated by a driving means, and adjustably related thereto, a strap operated by said eccentric, a plurality of pins attached to said strap, an equal number of gear wheels with each of which a pin co-acts, and a common gear member associated with and acted upon by said gear wheels.

In testinmony whereof, I have hereunto signed my name.

ROBERT W. A. BREWER.